Patented Apr. 18, 1933

1,904,639

UNITED STATES PATENT OFFICE

ROBERT ERWIN WINDECKER, OF PAINESVILLE, OHIO

MANUFACTURE OF CEMENT

No Drawing.    Application filed September 25, 1930.    Serial No. 484,469.

This invention relates to improvements in the manufacture of hydraulic cements. The invention includes improvements in the manufacture of hydraulic cement from raw materials or mixtures containing a flux, which mixtures, after clinkering, are ground with calcium or magnesium chloride to produce a hydraulic cement of high quality.

In the manufacture of hydraulic cement, the use of fluxing agents to produce cements is well known, for example, the addition of calcium fluoride to the raw mixtures before the sintering process.

This invention includes the use of calcium fluoride, or fluoride compounds, as a fluxing agent in conjunction with the use of either calcium or magnesium chloride when incorporated or ground with the clinker and the usual gypsum retarder to produce hydraulic cement.

The action of calcium or magnesium chloride on a ground clinker made from raw materials containing a fluoride flux produces a hydraulic cement of high strength and quality.

The manufacture of hydraulic cement in accordance with the invention will be illustrated by the following example:

*Example I.*—117–120 parts by weight calcium carbonate, or calcium oxide equivalent, clay or other silicious material, or mixtures of such materials, or of such materials and silica comprising 5.4–5.7 parts alumina, 20.2–19.9 parts silica, 2.1–2.3 parts iron oxide and 1–3 parts calcium fluoride after appropriate grinding are clinkered in a kiln, for example, at a temperature approximating 2750–2950° F., the clinker then ground with the usual retarder and 1–3 parts calcium or magnesium chloride to produce hydraulic cement.

The raw materials subjected to the clinkering operation may be ground separately or together, wet or dry, and the ground materials may be supplied to the clinkering operation as a powder, or in agglomerated form, or as a slurry.

It is understood that the detailed example given above is intended merely to illustrate the invention, and that the invention is not limited specifically thereto. The proportions of the raw materials, for instance, may be varied to conform with varying hardening properties and strengths of cement required. In the production of high early strength cements of high lime content, the combined use of fluoride fluxes in the raw mixtures and the addition of chlorides of calcium or magnesium to the clinker during the grinding or cement blending process is advantageous.

The use of calcium fluoride, or other fluoride flux in conjunction with the addition of calcium or magnesium chloride during or after grinding of the clinker offer similar advantages in the manufacture of white hydraulic cement from raw materials of limited iron content. The use of such a flux and after clinkering, the incorporation of calcium or magnesium chloride to produce hydraulic cement is advantageous in a raw material mixture such as the following examples:

*Example II.*—120 parts by weight of calcium carbonate, or calcium oxide equivalent, kaolin or clay or other silicious material, or mixtures of such materials, or of such materials and silica comprising 8.0 parts alumina and 25.5 parts silica and 1–3 parts calcium fluoride, after appropriate grinding are clinkered in a conventional rotary kiln, for example, at a temperature approximating 2700–2900° F. The iron content of the mixture subjected to the clinkering operation is limited not to exceed about 0.4% of iron, computed as iron oxide, the clinker then ground with the retarder and 1–3 parts calcium or magnesium chloride to produce hydraulic cement.

*Example III.*—120 parts by weight of calcium carbonate, or calcium oxide equivalent, kaolin or clay or other silicious material, or mixtures of such materials, or of such materials and silica, comprising 9.3 parts alumina and 21.9 parts silica and 1–3 parts calcium fluoride, after appropriate grinding are clinkered in a conventional rotary kiln, for example, at a temperature approximating 2700–2900° F. The iron content of the mixture subjected to the clinkering operation is limited not to exceed about 0.4% of iron, computed as iron oxide, the clinker then ground with the retarder and 1-3 parts calcium or magnesium chloride to produce hydraulic cement.

*Example IV.*—120 parts by weight of calcium carbonate, or calcium oxide equivalent, kaolin or clay or other silicious material, or mixtures of such materials, or of such materials and silica comprising 6.5 parts alumina and 23.3 parts silica and 1-3 parts calcium fluoride, after appropriate grinding are clinkered in a conventional rotary kiln, for example, at a temperature approximating 2750–2950° F. The iron content of the mixture subjected to the clinkering operation is limited not to exceed about 0.4% of iron, computed as iron oxide, the clinker then ground with the retarder and 1-3 parts calcium or magnesium chloride to produce hydraulic cement.

It is understood that the detailed examples given above are intended merely to illustrate the invention, and that the invention is not limited specifically thereto. The addition of calcium fluoride, or other alkaline earth metal fluorides, not only tends to decrease the more advantageous range of clinkering temperatures but also assists in the production of cements developing high early strengths in conjunction with good ultimate strengths. The amount of calcium fluoride or other fluoride flux may be varied, for example, from ½ to 5%. In general, 1.5% to 2.5%, based on the weight of the clinker produced, is an advantageous proportion. The flux may be added to the raw material mixture at any time before or during the clinkering operation.

The development of high early strength of cement produced by the addition of a fluoride flux to the raw material as just described and the addition of calcium or magnesium chloride to the clinker is not limited, according to the invention, to the proportions given above. The calcium or magnesium chloride may be varied, for example, from ½ to 5%, in general 1.5% to 2.5%, by weight of the clinker, and the calcium or magnesium chloride may be added to the clinker before grinding or during grinding or blending or at any time, including the time of mixing of the cement with stone, sand or other materials with water to mould or produce solid objects. The chloride may be added with the suitable amount of gypsum retarder.

In making hydraulic cement acording to this invention, the clinkering operation may be carried out in any type of furnace or kiln found suitable for the operation, the invention not being limited to the use of a rotary kiln given merely as an example.

I claim:

1. In the manufacture of hydraulic cement, the improvement comprising clinkering a mixture containing calcium carbonate, alumina, silica, iron and a fluoride flux, and incorporating a chloride selected from the group consisting of calcium and magnesium chlorides in the cement produced by grinding the clinker.

2. In the manufacture of hydraulic cement, the improvement comprising clinkering a mixture containing calcium carbonate, alumina, silica and a fluoride flux and incorporating a chloride selected from the group consisting of calcium and magnesium chlorides in the cement produced by grinding the clinker.

3. In the manufacture of white hydraulic cement, the improvement comprising clinkering a mixture containing calcium carbonate, alumina, silica and a fluoride flux, the iron content of which is limited so that the clinker produced will contain less than about 0.4% iron, computed as iron oxide, and incorporating a chloride selected from the group consisting of calcium and magnesium chlorides in the cement produced by grinding the clinker.

In testimony whereof I affix my signature.

ROBERT ERWIN WINDECKER.